Nov. 19, 1963  A. DROZ  3,111,003
DIVING WATCH
Filed Sept. 24, 1962

INVENTOR
ARTHUR DROZ
By Irwin S. Thompson
ATTY.

United States Patent Office 3,111,003
Patented Nov. 19, 1963

3,111,003
DIVING WATCH
Arthur Droz, 9 Rue du Mont-Blanc,
Geneva, Switzerland
Filed Sept. 24, 1962, Ser. No. 225,603
Claims priority, application Switzerland Sept. 27, 1961
1 Claim. (Cl. 58—126)

The importance of decompression time for diving is known, that is the time it takes for the diver to climb from the depth attained during the dive to the surface of the water. This time depends on the length and depth of the dive and, if it is not observed, the most serious accidents may result for the diver. This notion has been worked out by diving experience, and it is now known that, in order to avoid all accidents, knowledge of the total decompression time alone is not enough but that decompression times at various levels during surfacing must also be considered, i.e. the times during which the diver must stop at various depths before attaining the next level. For the depths attained ordinarily, e.g., 50 or 60 m., a first climb level at 9 m. below the surface of the water, a second level at 6 m. and a third level at 3 m. are expected, with the decompression times at these various levels being increasingly long.

Special watches were, therefore, constructed which permit the diver to read the total decompression time in terms of length and depth of dive, thus avoiding the necessity of carrying a decompression table under water which constitutes extra bothersome material and which might lead to error when read under water. Several known watches give this indication. It was moreover natural to study a watch which further gives the decompression times at said levels, the problem for the diver being to obtain this indication simply and without risking error.

The diving watch to which the present invention relates includes a first dial having a horological scale and a scale giving the decompression times at various levels in terms of length and depth of dive, and a second dial having a horological scale and a scale cooperating with one hand of the watch and giving the total decompression time in terms of length and depth of dive. It is characterized in that the second dial is capable of turning in relation to the first dial and has a window partially exposing the first dial, the whole being arranged in such a way that in placing, by rotating the second dial, a specific division of the horological scale of the latter opposite the division of the horological scale of the first dial corresponding to the total decompression time given by the hand on the second dial, for a given length and depth of dive, the window exposes on the first dial the decompression times at said levels corresponding to that length and to that depth.

The attached drawing illustrates, by way of example, one embodiment of the subject of the invention.

Figure 1:
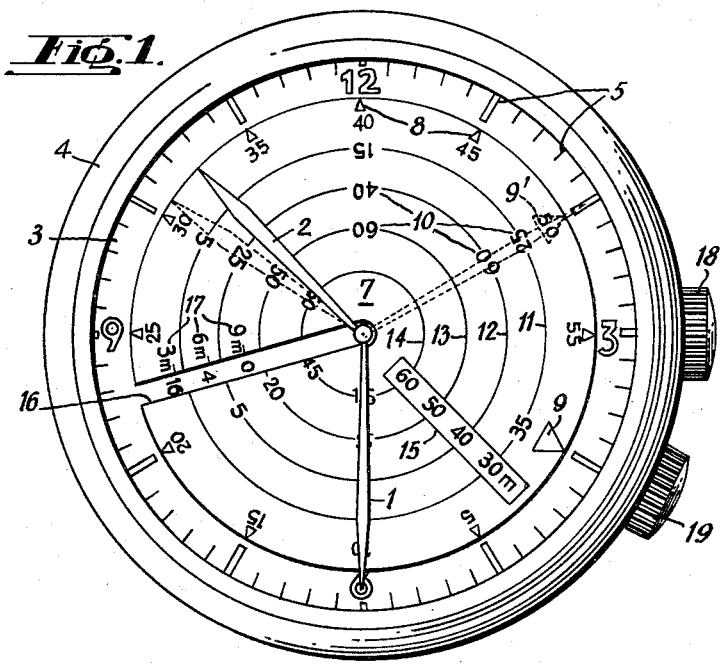
Figure 2:
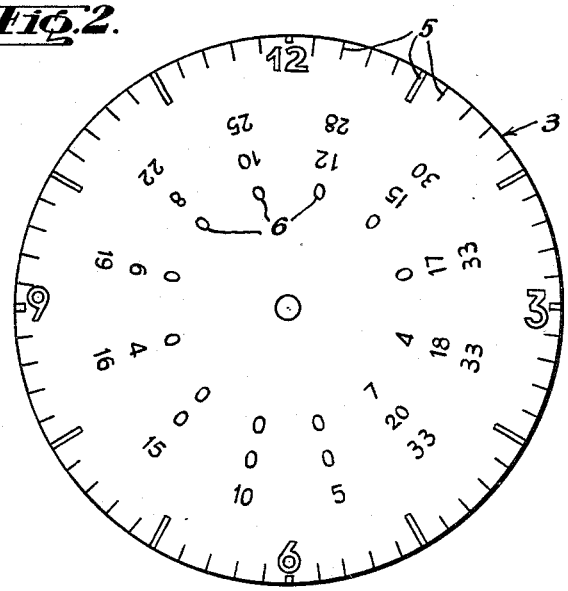

FIGURE 1 is a view of the whole.
FIGURE 2 is a view of a member shown in FIG. 1.

The illustrated diving watch includes an ordinary horological movement, not shown, which actuates, in the usual way, a minute hand 1 and an hour hand 2. The watch includes a first dial 3 which is attached to rim 4 of the watch case. This first dial 3 has a horological scale 5 which cooperates with hands 1 and 2 to give the time. It also bears a second scale 6 which gives the decompression time at various levels, levels of 9 m., 6 m. and 3 m. beneath the surface of the water in the example chosen. The latter scale comprises twelve series of three figures arranged radially, the figures giving the decompression times in minutes and being calculated according to known tables in terms of the length and depth of dive.

The watch comprises a second dial 7 which partially covers the first dial 3 and which is capable of turning about its center. This dial bears a horological scale 8 showing 60 minutes all around the dial. Zero position is specially indicated by an indicator 9. Dial 7 further carries a scale 10 giving total decompression time in terms of length and depth of dive. This scale 10 is placed according to four concentric circles 11, 12, 13 and 14 corresponding to various diving depths, 30, 40, 50, and 60 m. respectively in the example chosen, which depths are printed on dial 7 in a table 15. The figures placed on these circles indicate the total decompression time in minutes, calculated according to known tables in terms of dive length and depth. Dial 7 also has a window 16 which partially exposes dial 3 placed below dial 7, and carries a scale 17 indicating the levels.

The watch further comprises a winder 18 which also enables the watch to be set, in known manner, and a control button 19 by which dial 7 can be turned about its center.

It is obvious that a glass covers the dials and the hands and that the watch is of water-tight construction to avoid water leakage between the dial and the rim, between the rim and the case and into the bearings which the winding 18 and control button 19 axes go through.

The watch is used as follows: suppose that it is 10:10 when the diver begins his dive. This time is indicated by hands 1 and 2 in the position shown by dotted lines in FIG. 1. The diver then turns dial 7 by means of control button 19 in such a way that indicator 9 of the dial is placed below minute hand 1, in the position shown by 9' in FIG. 1. The object of this operation is to make position zero on horological scale 8 of dial 7 correspond with minute hand 1 so that the diver is able at any time to read the actual length of his dive by the position of hand 1 with respect to scale 8. Suppose now that the diver wishes to surface after a dive of 20 minutes. At this time, the hands indicate 10:30 (the position of hands 1 and 2 illustrated by solid lines in FIG. 1). With dial 7 having been placed as indicated above and indicator 9 occupying position 9', it is obvious that minute hand 1 is opposite minute 20 of scale 8, indicating that the dive has lasted 20 minutes. Furthermore, underneath hand 1, the diver is able to read figures 5, 20 and 45 of scale 10, arranged on circles 12, 13 and 14 respectively (there is no figure on circle 11 in this position. If, for example, the diver has attained a depth of 50 m., the watch gives a total decompression time of 20 minutes, indicated at the intersection of minute hand 1 and circle 13 corresponding to the depth of 50 m.

The diver then again turns dial 7 by means of button 19 in such a way that indicator 9 of this dial coincides with the minute of the ordinary time scale 5 on dial 3 corresponding to the time of total decompression, i.e. with minute 20 in the example chosen. When this setting has been made, indicator 9 is in the position illustrated in FIG. 1. The diver can then read through window 16, opposite scale 17, the decompression time by levels corresponding to a diving time of 20 minutes and a depth of 50 m., viz. 0 minutes for the 9 m. level (meaning the diver does not have to stop at this level), 4 minutes for the 6 m. level and 16 minutes for the 3 m. level. Obviously, the sum of the decompression times at the various levels is equal to the total decompression time read previously (20 minutes in the example chosen).

The watch described therefore has the advantage of constantly giving the time, like an ordinary watch, indicating to the diver at any moment how long he has been under water and, when he wishes to surface, indicating the total decompression time and the decompression times at various levels.

What I claim is:

A diving watch, including a first dial having a horological scale and a scale giving the decomposition times at the various levels in terms of length of time and depth of dive, and a second dial having a horological scale and a scale cooperating with one hand of the watch and giving the total decompression time in terms of length of time and depth of dive, characterized in that the second dial is capable of turning in relation to the first dial and has a window partially exposing the first dial, the whole being arranged in such a way that in placing, by rotating the second dial, a specific division of the horological scale of the latter opposite the division of the horological scale of the first dial corresponding to the total decompression time given by the hand on the second dial, for a given length of time and depth of dive, the window exposes on the first dial the decompression times at said levels corresponding to that length of time and to that depth.

References Cited in the file of this patent

UNITED STATES PATENTS

| | | |
|---|---|---|
| 2,892,304 | Eaves | June 30, 1959 |
| 3,058,653 | Des Granges | Oct. 16, 1962 |

FOREIGN PATENTS

| | | |
|---|---|---|
| 170,134 | Switzerland | Sept. 1, 1934 |